(12) United States Patent
Bannerman

(10) Patent No.: US 10,329,093 B2
(45) Date of Patent: Jun. 25, 2019

(54) CONVEYOR BRACKET

(71) Applicant: Laitram, L.L.C., Harahan, LA (US)

(72) Inventor: Adam E. Bannerman, Mandeville, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/772,203

(22) PCT Filed: Nov. 14, 2016

(86) PCT No.: PCT/US2016/061834
§ 371 (c)(1),
(2) Date: Apr. 30, 2018

(87) PCT Pub. No.: WO2017/087321
PCT Pub. Date: May 26, 2017

(65) Prior Publication Data
US 2018/0312338 A1    Nov. 1, 2018

Related U.S. Application Data

(60) Provisional application No. 62/255,750, filed on Nov. 16, 2015, provisional application No. 62/356,650, filed on Jun. 30, 2016.

(51) Int. Cl.
*B65G 15/62* (2006.01)
*B65G 21/22* (2006.01)

(52) U.S. Cl.
CPC ............. *B65G 15/62* (2013.01); *B65G 21/22* (2013.01); *B65G 2207/48* (2013.01)

(58) Field of Classification Search
CPC ........ B65G 15/62; B65G 21/22; B65G 21/02; B65G 21/06
USPC .................................. 198/841, 860.1, 861.1
See application file for complete search history.

(56) References Cited

U.S. PATENT DOCUMENTS

| | | | |
|---|---|---|---|
| 4,932,516 A * | 6/1990 | Andersson | B65G 15/62 198/823 |
| 6,269,939 B1 * | 8/2001 | Lapeyre | B65G 21/00 198/615 |
| 6,640,966 B2 | 11/2003 | Reatti | |
| 7,114,615 B1 * | 10/2006 | Karpy | B65G 21/20 198/860.1 |
| 8,562,241 B2 * | 10/2013 | Klepack | B65G 21/02 198/860.1 |
| 8,770,393 B1 * | 7/2014 | DeGennaro, Jr. | B65G 15/62 198/841 |
| 2006/0237292 A1 | 10/2006 | Ryan | |
| 2009/0008225 A1 | 1/2009 | Call et al. | |
| 2010/0193333 A1 | 8/2010 | Rogers et al. | |
| 2013/0277181 A1 * | 10/2013 | Kuiper | B65G 15/62 198/841 |

(Continued)

*Primary Examiner* — James R Bidwell
(74) *Attorney, Agent, or Firm* — Catherine M. Bishop

(57) ABSTRACT

A conversion bracket for converting a conveyor frame to accommodate a conveyor belt. The bracket includes a base, a plurality of shaft holders extending from a first end of the base and a plurality of wearstrip receptacles extending from a second end of the base. The bracket attaches to a shaft of a conveyor frame by inserting the shaft into the shaft holders. Wearstrips are inserted into the wearstrip receptacles, which are oriented and configured so that the inserted wearstrips rest on the tops of the shaft.

14 Claims, 13 Drawing Sheets

(56) References Cited

U.S. PATENT DOCUMENTS

2015/0210478 A1 7/2015 Batchelder et al.
2016/0355347 A1 12/2016 Rottier et al.

* cited by examiner and having wearstrips forming a carryway inserted therein;

CONVEYOR BRACKET

RELATED APPLICATIONS

The present application claims priority to U.S. Provisional Patent Application No. 62/255,750, filed Nov. 16, 2015 and entitled "Conveyor Bracket", and also claims priority to U.S. Provisional Patent Application No. 62/356,650, filed Jun. 30, 2015 entitled "Conveyor Bracket." The contents of both applications are herein incorporated by reference.

BACKGROUND

The invention relates generally to frames for power-driven conveyors. More particularly, the invention relates to brackets used to convert a pre-existing conveyor frame to a conveyor frame usable with a new or different type of conveyor belt, a conveyor converted from a first type of conveyor belt to a second type of conveyor belt and a method for performing the conversion.

Many kinds of conveyors are used to transport articles. Roller conveyors, for example, consist of an array of metal rollers arranged side by side along the length of a conveyor frame. The ends of the rollers are retained in opposite sides of the conveyor frame. The rollers rotate about axes directed widthwise across the conveyor perpendicular to the conveyance direction. The rollers may be passive, but are commonly driven to rotate by a drive belt. The width of the conveyor frame is fixed to accommodate the axial length of the rollers. Roller conveyors work well, but are notoriously noisy and often require repair. As another example, flat belt conveyors are also commonly used to transport articles. These conveyors include flat rubber or fabric belts tensioned between drive and idler pulleys at opposite ends. But a flat belt can drift to one side of the pulleys and stretch over time. If it tears, the belt must be removed from the conveyor, the torn section cut out, and a new section spliced in.

Because of the shortcomings of roller conveyors and flat belt conveyors, it is often desirable to replace them with thermoplastic low tension direct drive conveyor belts, examples of which include, but are not limited to Thermodrive®, available from Intralox, LLC of Harahan, La., SuperDrive™, available from Volta Belting and others known in the art. But converting to a modular belt conveyor from a roller conveyor, a flat belt conveyor, or another type of conveyor is usually a time-consuming and costly operation and requires the addition of wearstrips or other components. The conversion is difficult mainly because conveyor frames are typically designed to accommodate the rollers or the belt they were originally specified to be used with.

Thus, there is a need for a simple means for converting a pre-existing conveyor frame into a conveyor that runs a different type of conveyor belt.

SUMMARY

A bracket for retrofitting a conveyor frame to accommodate a new conveyor belt comprises a base, a plurality of shaft holders extending from a first end of the base and a plurality of wearstrip receptacles extending from a second end of the base. The bracket attaches to a shaft of a conveyor frame by inserting the shaft into the shaft holders. Wearstrips are inserted into the wearstrip receptacles, which are oriented and configured so that the wearstrips rest on the tops of the shaft.

According to one aspect, a bracket for connecting a wearstrip to a conveyor frame shaft comprises a base extending laterally from a first side to a second side, a shaft holder comprising a protrusion extending from a first end of the base and having an opening for receiving the frame shaft and a wearstrip receptacle extending from a second end of the base and comprising a seat for receiving a wearstrip such that a wearstrip inserted in the wearstrip receptacle will rest on the top of the frame shaft.

According to another aspect, a method of retrofitting a positive-drive low tension thermoplastic conveyor belt to a flat belt conveyor frame comprises the steps of attaching a plurality of conversion brackets to shafts on the conveyor frame, each conversion bracket including a plurality of shaft holders and a plurality of wearstrip holders and inserting wearstrips into the wearstrip holders, such that the wearstrips rest on the tops of the shafts.

According to another aspect, a conveyor frame comprises a central spine extending from a first end to a second end, a plurality of shafts extending from the central spine, a plurality of brackets attached to selected shafts and a plurality of wearstrips inserted into wearstrip holders on the brackets such that the wearstrips rest on the tops of the shafts.

BRIEF DESCRIPTION OF THE DRAWINGS

These aspects and features of the invention are described in more detail in the following description, appended claims, and accompanying drawings, in which:

DETAILED DESCRIPTION

Figure 1:
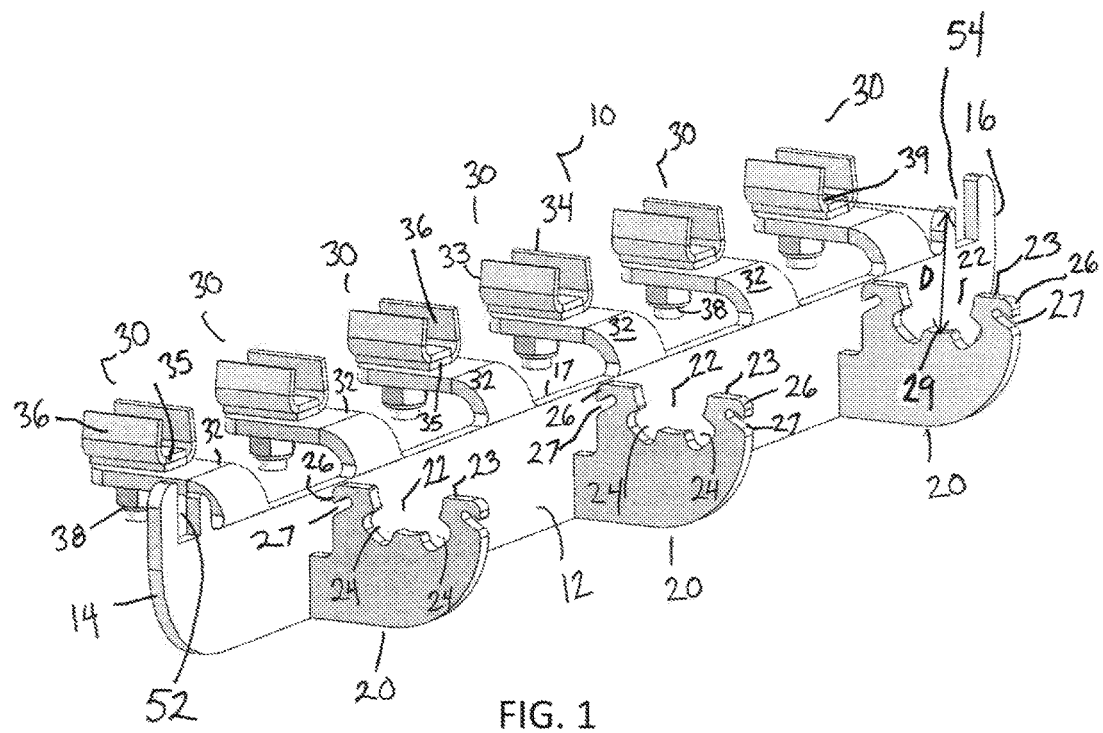
FIG. 1 is an isometric view of a first bracket of an embodiment of the invention.
Figure 2:
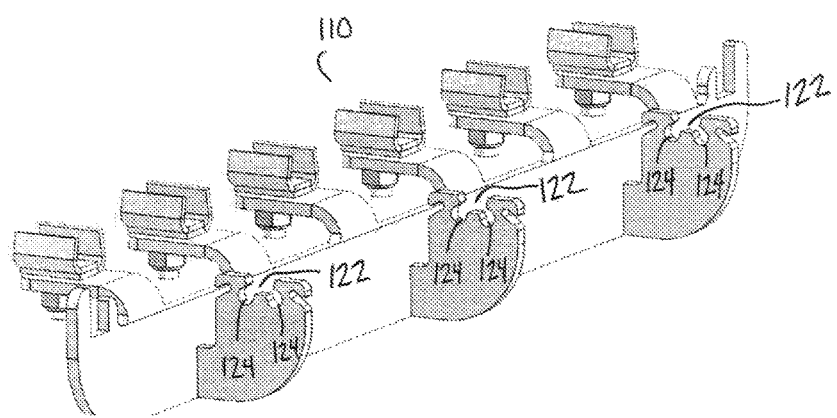
FIG. 2 is an isometric view of a second bracket of an embodiment of the invention.
Figure 3:
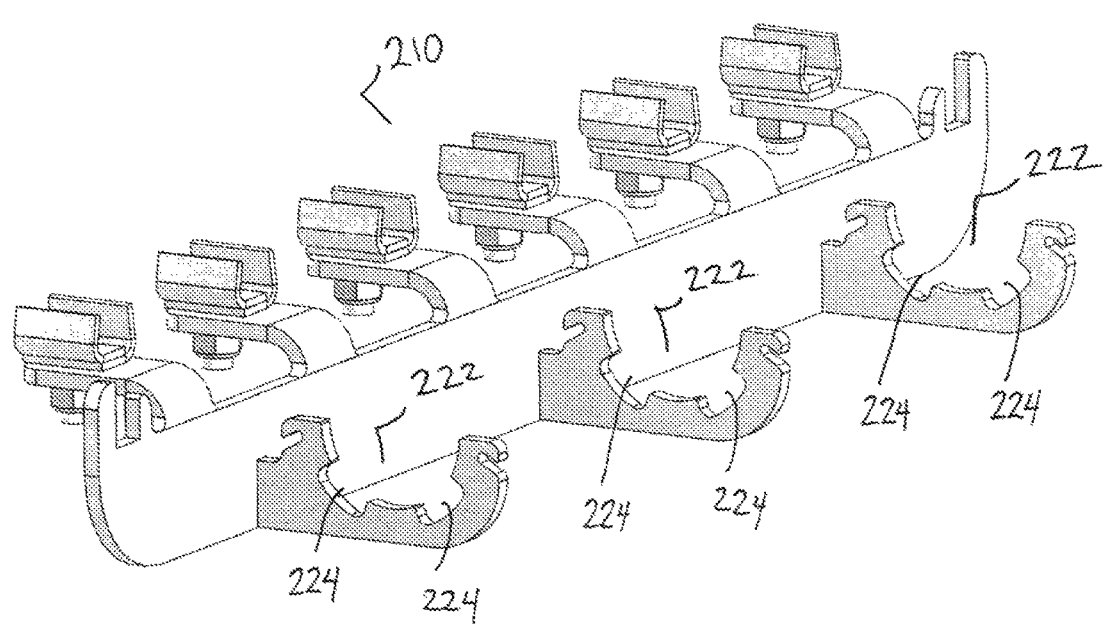
FIG. 3 is an isometric view of a third bracket of an embodiment of the invention.

A conveyor bracket for converting a conveyor frame embodying features of the invention is shown in FIG. 1. The conveyor bracket 10 includes a base 12 comprising a substantially planar metal substrate extending laterally from a first side 14 to a second side 16. A plurality of shaft holders 20 extend from a first (front) end of the bracket for attaching the bracket 10 to a shaft in a pre-existing conveyor frame, as described below. Each illustrative shaft holder 20 comprises a protrusion having an opening 22 at a top edge 23 for receiving the shaft. The opening 22 is sized and positioned based on the size of the shaft. For example, FIG. 1 shows a bracket 10 with shaft openings 22 designed to accommodate a round shaft of about 1" diameter. FIG. 2 shows a bracket 110 with openings 122 designed to accommodate a round shaft having a diameter of about 0.5". FIG. 3 shows a bracket 210 with openings 222 designed to accommodate a round shaft having a diameter of about 1.75". The shaft opening of the bracket may have any suitable size, shape and configuration to accommodate a particular size and shape conveyor component, such as a shaft. Each shaft opening 22, 122 and 222 also includes cleaning recesses 24, 124, 224 to promote hygiene, though the invention is not so limited.

The top edge 23 of the shaft holder 20 further includes tabs 26 formed by notches 27 on each side of the opening 22 for securing the shaft after insertion of the shaft in the opening 22, as described below. Any suitable device for securing a shaft may be used.

The bracket 10 also includes a plurality of wearstrip receptacles 30 extending from a second end of the bracket 12 opposite the shaft holders 20. Each wearstrip receptacle 30 comprises a curved arm 32 extending from the top edge 17 of the base 12 and a pair of adjustable brackets 33, 34 that cooperate to form a seat for a wearstrip. Each illustrative adjustable bracket 33, 34 comprises a bottom wall 35 and a side wall 36 forming an "L" shape. To form the seat, the bottom walls are placed in an overlapping fashion on the top of the curved arm 32 and secured using a fastener 38, shown as a nut and bolt inserted through aligned openings in the bottom walls and curved arm. The seats for the wearstrips can be adjusted in size and orientation.

The width of the bracket 10 can change with conveyor width. The spacing of the wearstrip can change with conveyor width. It is also feasible to manipulate the spacing of the wearstrip to facilitate a conveyor shape or a product loading. For example, the illustrative design spaces wearstrips about 3 inches apart, but the invention is not so limited, and the spacing can change based on the particular installation guidelines for the conveyor belt. The invention can also be used to convert a conveyor frame for modular plastic conveyor belts or other conveyor belts and is not limited to a thermoplastic, direct drive conveyor belt.

The wearstrip receptacles 30 and shaft openings 22 are positioned and located such that a wearstrip inserted in the receptacle will rest on a shaft inserted in the shaft opening of the bracket during operation. Thus, the bottom surface 39 of the wearstrip seat (formed by the top surface of the top bottom wall) is located above the bottom 29 of the opening 22 by a vertical distance that is about equal to or slightly greater than the diameter D of the shaft that fits into the opening 22 to place the bottom of the wearstrip slightly above or on the top of the shaft. The wearstrip can deflect slightly under load to rest on the shaft after installation.

The conversion bracket 10 may also include containment block receptacles 52, 54 at each side of the base 12. The bracket 10 may include containment block receptacles on one or both sides. The illustrative containment block receptacles 52, 54 comprise slots extending between two arms that extend up from the upper edge 17 of the base 12 in the vicinity of each side 14, 16.

Figure 4:
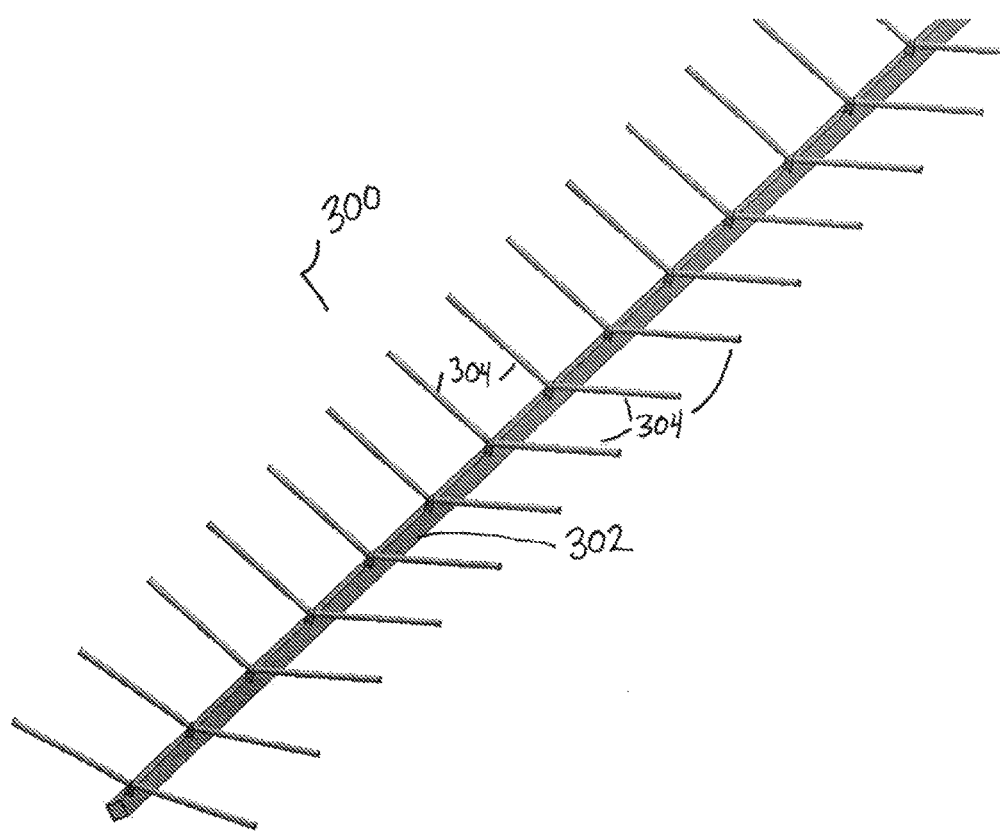
FIG. 4 shows an embodiment of a pre-existing conveyor frame that can be retrofit using a bracket of an embodiment of the invention.

The conversion bracket 10 may be used to convert a pre-existing frame, such as the frame 300 shown in FIG. 4 to accommodate a new conveyor belt. The frame 300 of FIG. 4, which is known as a "rabbit ear conveyor frame" includes a central spine 302 and a plurality of shafts 304 extending up and out at an angle from the central spine. The shafts 304 form "rabbit ears" to allow troughing of a conveyor belt. The illustrative shafts 304 are spaced about 2 feet apart along the length of the spine 302.

Figure 5:
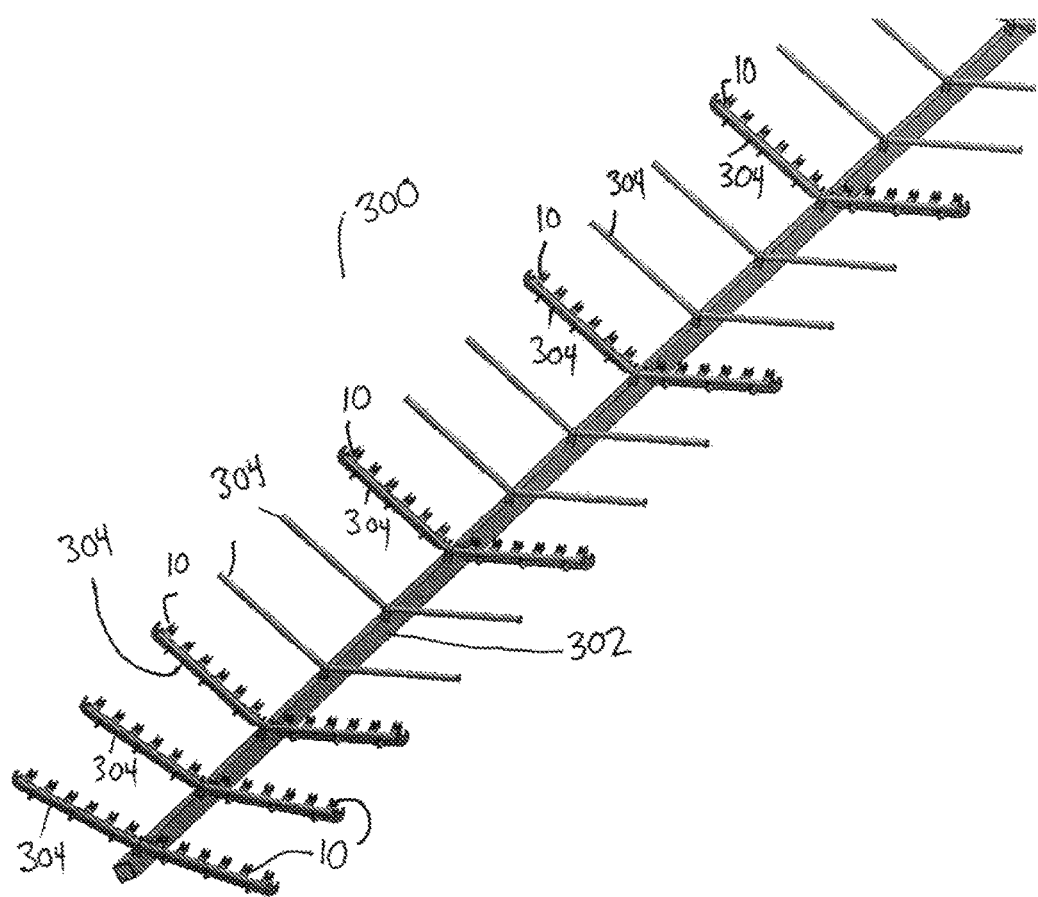
FIG. 5 shows the conveyor frame of FIG. 4 with a plurality of conversion brackets attached thereto.

As shown in FIG. 5, a plurality of conversion brackets 10 may be attached to selective shafts 304 to allow installation of wearstrips on the frame. The conversion brackets 10 are attached by inserting the shafts 304 into the shaft openings 22 of the brackets 10.

Figure 6:
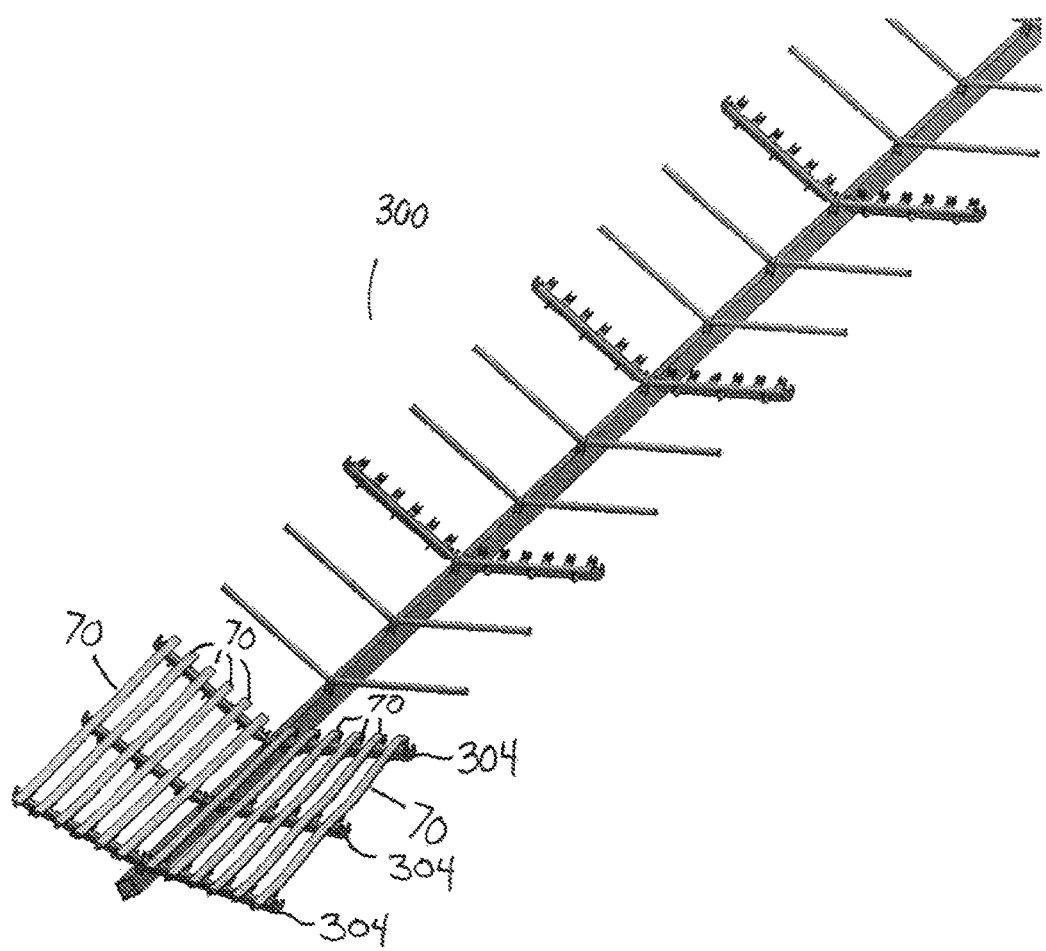
FIG. 6 shows the conveyor frame of FIG. 5 with a plurality of wearstrips inserted in the conversion brackets.
Figure 7:
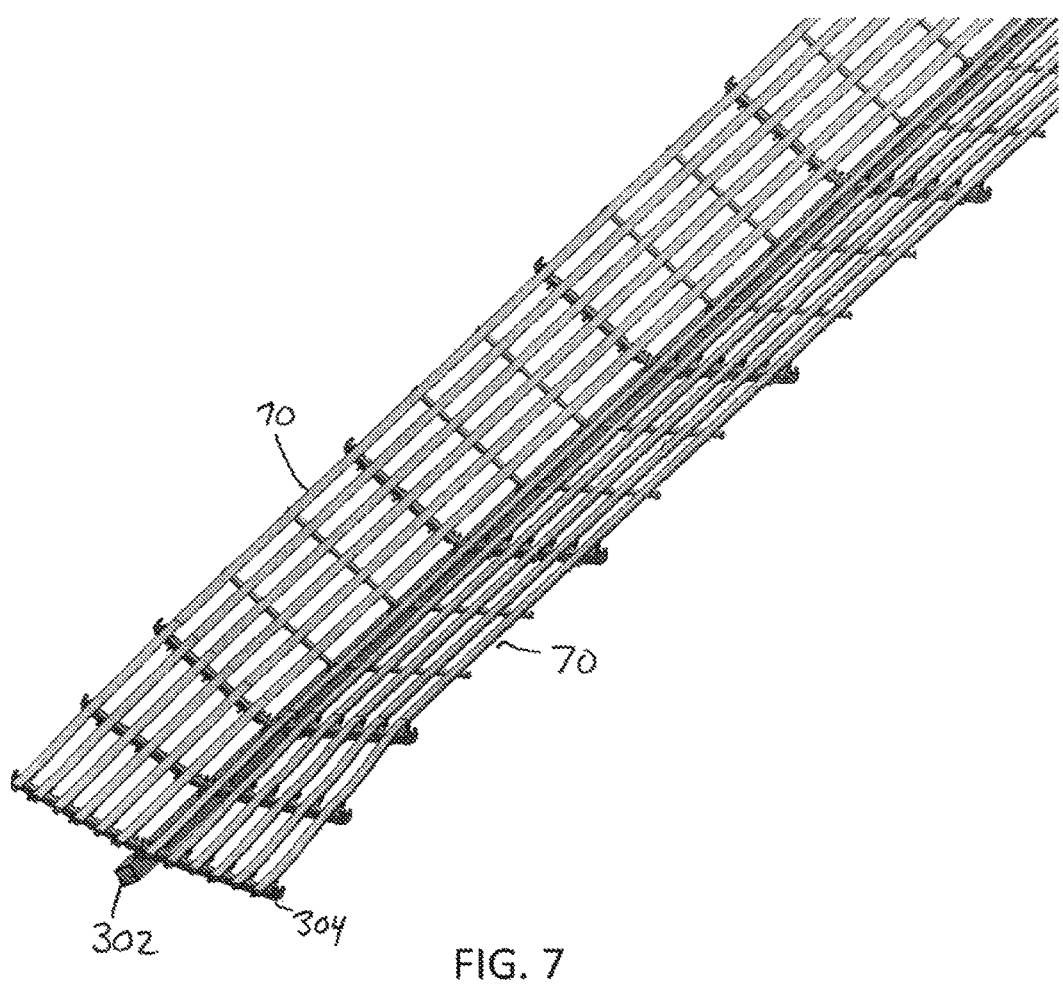
FIG. 7 shows a converted frame using a conversion bracket of an embodiment of the invention.

After assembling the conversion brackets 10 on the selected shafts 304, wearstrips 70 are inserted into the wearstrip receptacles, as shown in FIG. 6. The wearstrips 70 can be bent and—or twisted to conform to the wearstrip receptacles, particularly in the transition areas at the ends of the frame. After placing wearstrips 70 along the length and across the width of the frame to form a carryway, as shown in FIG. 7, the wearstrips may be secured to the wearstrip receptacles using bolts or other suitable fasteners. The wearstrips 70, when inserted in the wearstrip receptacles 30, rest on the shafts 304 or slightly above the shafts 304 so they can deflect into contact with the shafts 304 under load, allowing the original frame to support the carryway and eliminating the need to remove components of the original frame.

Figure 8:
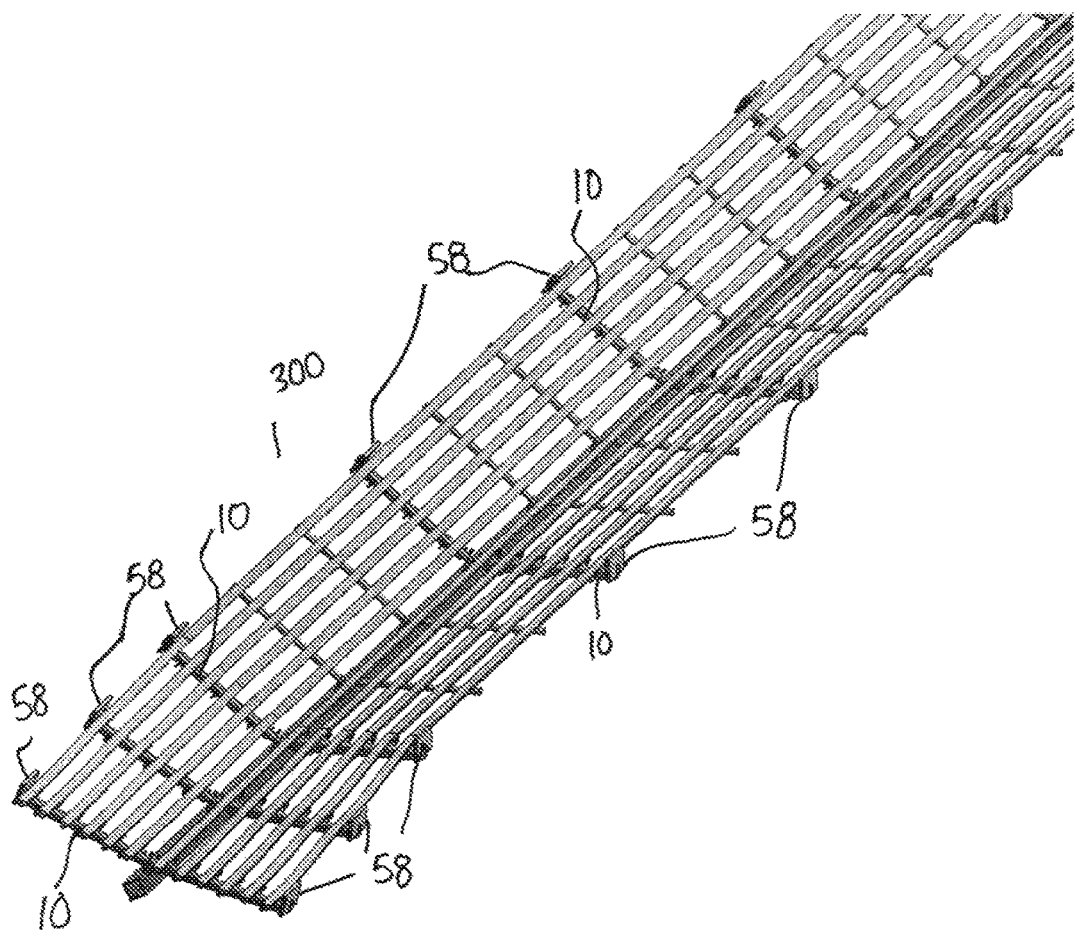
FIG. 8 shows the converted frame of FIG. 7 with containment blocks.
Figure 9:
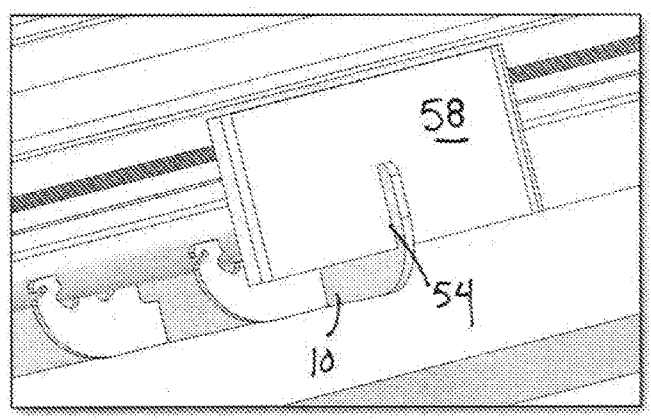
FIG. 9 is a detailed view of a containment block inserted in a conversion bracket.

After assembling the wearstrips, containment blocks 58 for containing a conveyor belt on the carryway are inserted in the containment block receptacles 52, 54 of the brackets, as shown in FIGS. 8 and 9. In the illustrative embodiment, the slots 52, 54 forming the containment block receptacles are sized and shaped to receive and hold the containment blocks by press-fit, though the invention is not so limited. For example, the containment blocks can be retained mechanically, such as with a rivet, pin or other fastener). In this manner, the containment blocks 58 can be easily installed, removed and—or replaced as needed.

Figure 10:
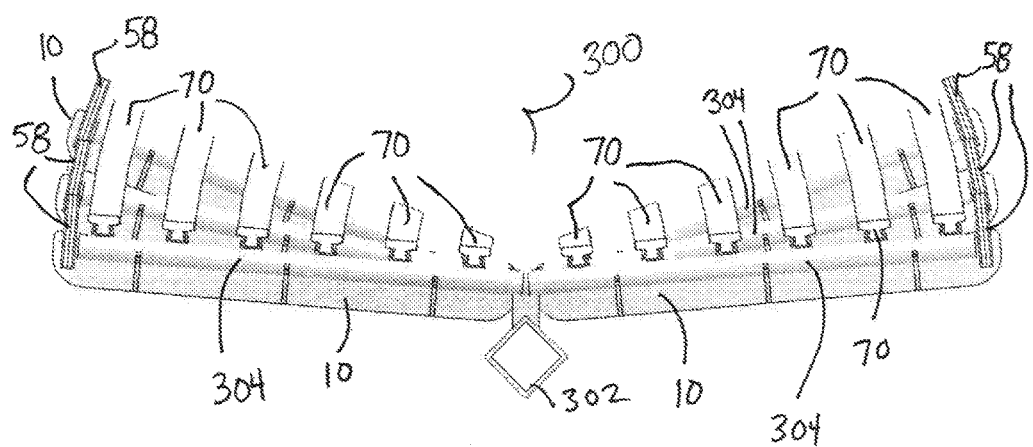
FIG. 10 is a front view of the converted frame of FIG. 8.

FIG. 10 is a front view of the frame 300 after conversion using the brackets 10 of an embodiment of the invention. As shown, the brackets 10 allow rapid integration of wearstrips 70 and containment blocks 58 with minimal tooling, with minimal changes to the structure of the underlying frame. The illustrative wearstrips 70 have a substantially T-shaped cross section, with the trunk of the "T" inserted in the receptacles and the top protruding above the receptacles. The wearstrips 70 may include a metal coating on the bottom surface to provide beam stiffness and a low friction plastic material, such as UHMW, on top. The invention is not limited to the illustrative wearstrips, and the wearstrips could have any suitable size, shape, configuration, material and combination of materials, with the bracket configured to accommodate the wearstrips.

Figure 11:
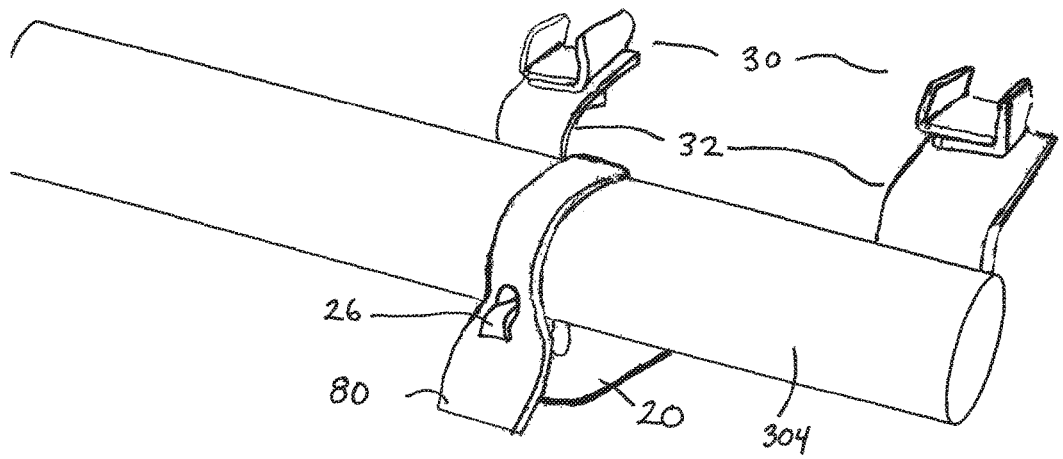
FIG. 11 is a close up view of a shaft fastener for securing a shaft in a bracket during a retrofit.
Figure 12:
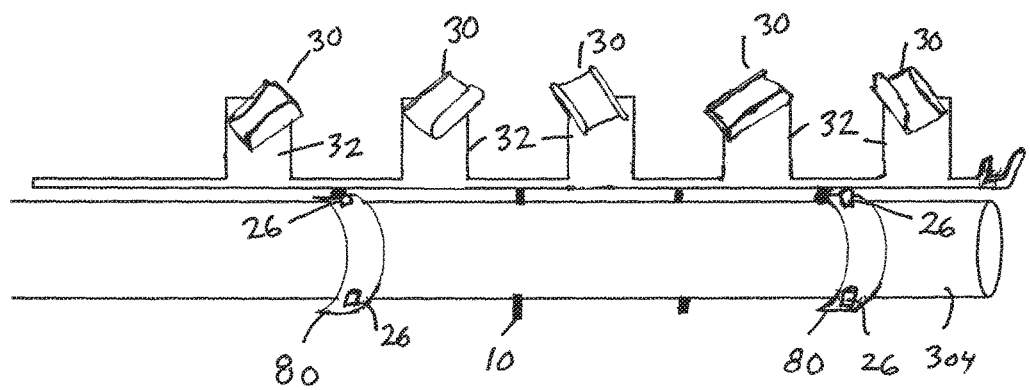
FIG. 12 is a top view of a shaft inserted in a bracket and secured using a shaft fastener during a retrofit

Referring to FIGS. 11 and 12, in one embodiment, a fastener may be used for placing the shafts in the brackets. For example, a strap 80 can wrap around the tops of the shafts 304 after insertion in the openings 22 and lock into place using tabs 26 that insert through openings in the strap.

The illustrative strap is formed of urethane, but the invention is not so limited. The straps allow accurate placement by preventing rotation of the shaft and bracket during assembly. The brackets can be welded in place after proper positioning and removal of the straps 80.

Figure 13:
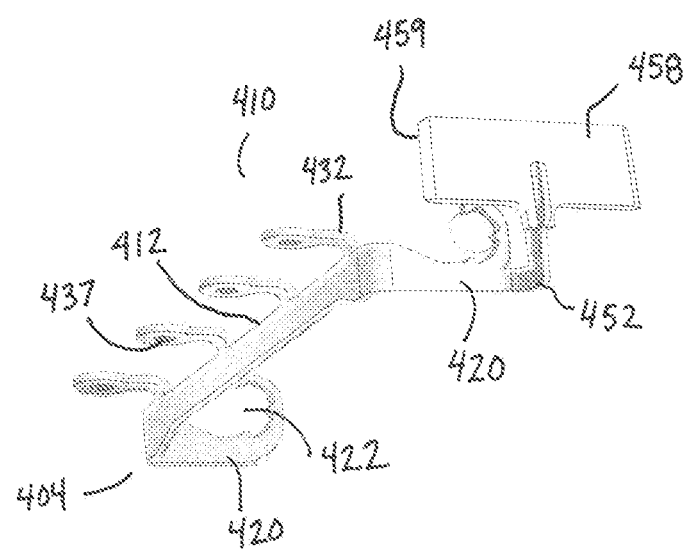
FIG. 13 shows another embodiment of a conveyor bracket suitable for use with a conveyor frame.
Figure 14:
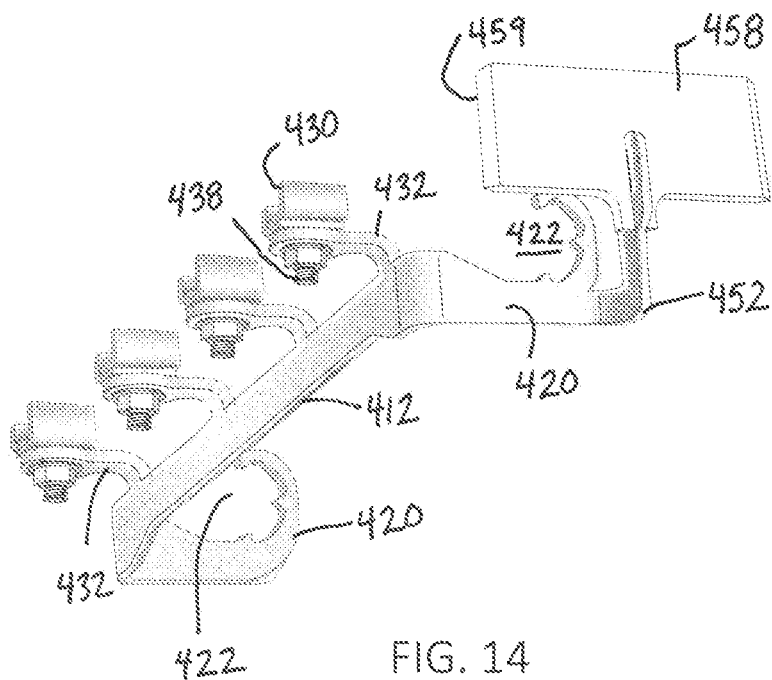
FIG. 14 shows the conveyor bracket of FIG. 13 with wearstrip receptacles inserted.
Figure 15:
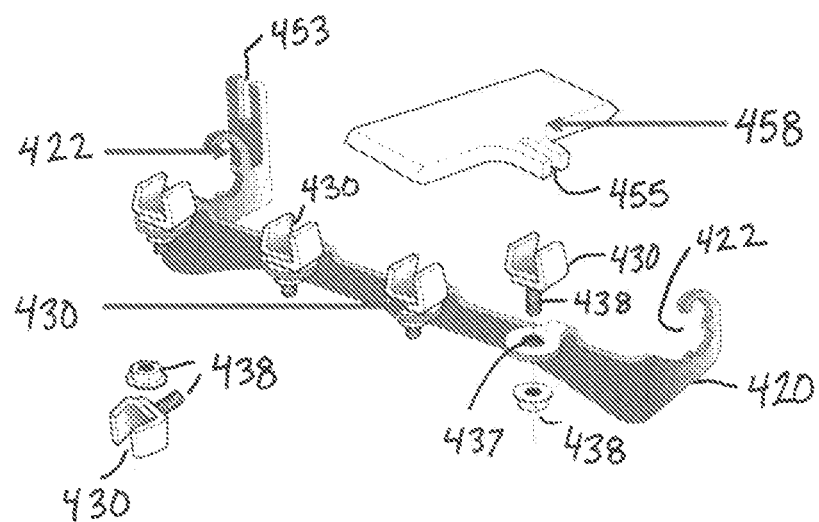
FIG. 15 is an exploded view of the conveyor bracket of FIG. 14.

The conveyor bracket is not limited to these embodiments. FIGS. 13-19 show an embodiment of a conveyor conversion bracket that may be formed of laser-cut, bent-to-order stainless steel. In the embodiment of FIGS. 13-19, the shaft openings for receiving a shaft of a conveyor may be differently configured, and—or, the block receptacles may be set forward or rearward from the main base of the bracket. FIGS. 13, 14 and 15 show a conveyor bracket 410 for converting a conveyor frame according to another embodiment. The conveyor bracket 410 includes a base 412 having arms extending in a first direction to form shaft holders 420. Each shaft holder 420 curves up and inwards to define an opening 422 at an inner edge for receiving a shaft 404 of a conveyor frame. The base may have any suitable number of shaft holders 420 spaced apart at any suitable intervals. The shaft holder 420 can be sized and shaped to accommodate any suitable conveyor frame shaft.

Wearstrip receptacles arms 432 extend in a second direction from the bracket 412 opposite the shaft holders 420. The wearstrip receptacle arms 432 bend up and back in the second direction, terminate in openings 437 through which fasteners 438 for the wearstrip receptacles 430 are inserted, as shown in FIGS. 14 and 15. The invention is not limited to the illustrative wearstrip receptacle, and any suitable means for retaining the wearstrip on the bracket may be used.

An L-shaped block containment arm 452 extends laterally outwards from the front end of a shaft holder 420 and includes an upper slot 453 or other seat for holding a containment block 458. In the illustrative embodiment, the bracket is configured and the containment block sized so that the rear edge 459 of the containment block 458 aligns with the bracket base 412, though the invention is not so limited. The illustrative containment block 458 has a lower slot 455 for fitting with the containment block seat on the block containment arm. Other suitable means for seating the containment block may be used.

Figure 16:
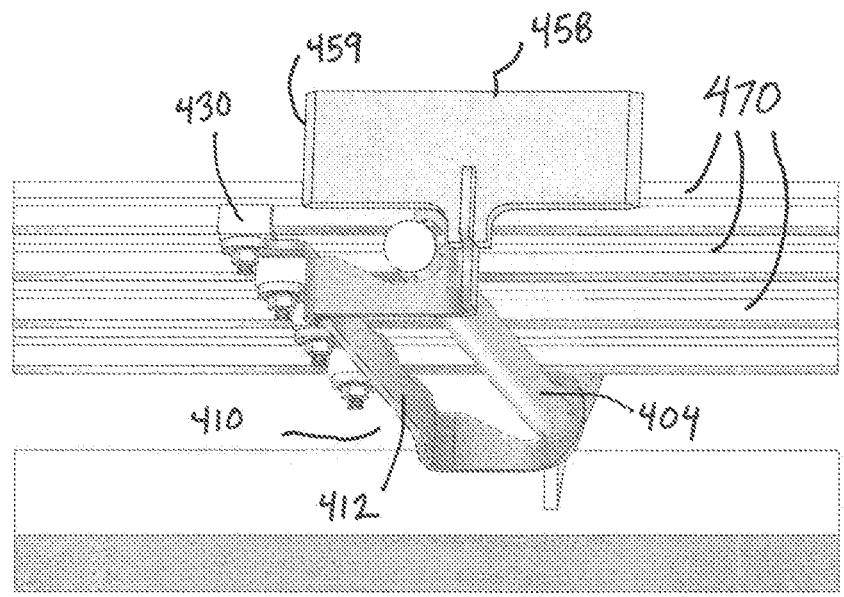
FIG. 16 shows the conveyor bracket of FIG. 14 mounted on a shaft and having wearstrips forming a carryway inserted therein.
Figure 17:
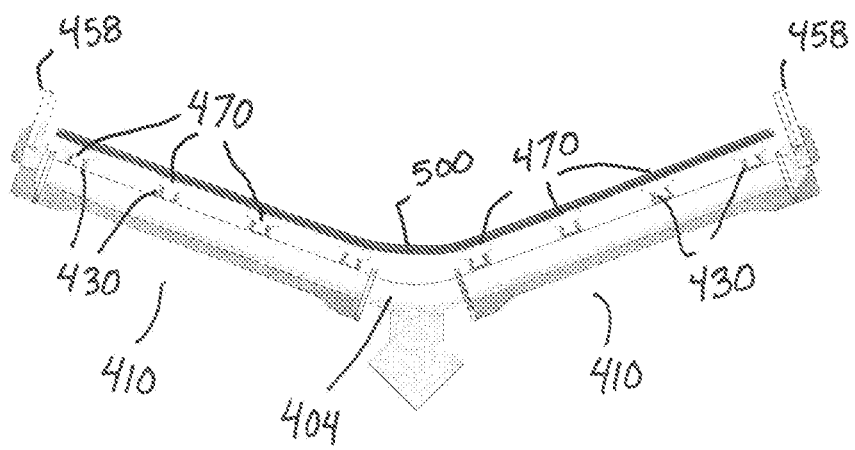
FIG. 17 is a front view of the converted frame of FIG. 16 with a conveyor belt.
Figure 18:
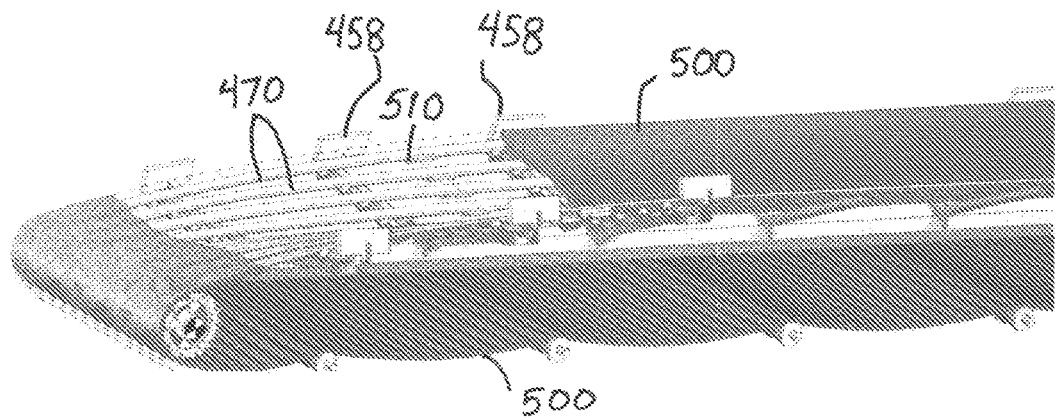
FIG. 18 is an isometric partially cut-away view of a converted conveyor frame using a plurality of conveyor brackets of an embodiment of the invention

As shown in FIGS. 16-18, the bracket 410 may be mounted on a conveyor shaft 404 to integrate wearstrips 470 to a conveyor frame. A plurality of brackets 410 may be used to convert a frame, which each bracket mounted in a shaft. The wearstrips 470 may be inserted in the receptacles 430 to convert a conveyor having shafts 404 and form a carryway for a conveyor belt 500. In one embodiment, the bracket 410 may be welded to the shafts 404, though the invention is not so limited. The embodiment of FIG. 16 shows a troughed belt.

Figure 19:
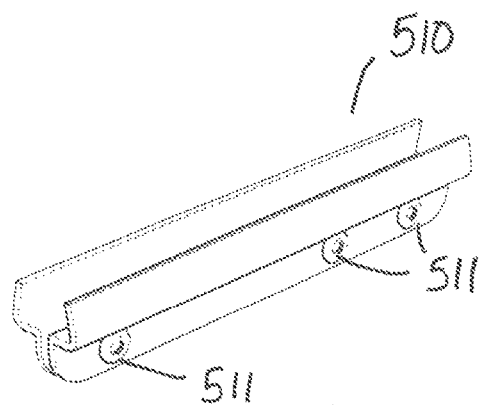
FIG. 19 shows a wearstrip connector suitable for use with the converted conveyor frame of FIG. 18.

Referring to FIGS. 18 and 19, a wearstrip connector 510 may also be used to connect the ends of serial wearstrips in the converted conveyor. The illustrative wearstrip connector 510 comprises two halves that mate to form a seat for the ends of the wearstrips. Fasteners 511 may be inserted in the base of the wearstrip connectors to hold the two halves together.

In one embodiment, the wearstrip receptacles 430 may be variably spaced along the length of the bracket. For example, the wearstrip receptacles may be closer in the center of the conveyor and spaced farther apart at the side edges to optimize the converted conveyor for troughing.

The conversion bracket of the illustrative embodiments allows quick retrofitting of a conveyor frame to accommodate a new or different conveyor belt. The conversion bracket limits downtime and while ensuring cleanability of the converted conveyor frame. The wearstrips may be easily removed and changed if needed.

Although the invention has been described with reference to specific versions, other versions are possible. The scope of the invention is not meant to be limited to the exemplary versions described in detailed.

What is claimed is:

1. A bracket for connecting a wearstrip to a conveyor frame shaft, comprising:
    a base extending laterally from a first side to a second side;
    a shaft holder comprising a protrusion extending from a first end of the base and having an opening for receiving the conveyor frame shaft;
    a wearstrip receptacle on the base, the wearstrip receptacle comprising a seat for receiving a wearstrip such that a wearstrip inserted in the wearstrip receptacle will rest above a conveyor frame shaft received in the opening; and
    a first containment block receptacle at the first side of the base for receiving a first containment block.

2. The bracket of claim 1, wherein the bracket includes a plurality of shaft holders and a plurality of wearstrip receptacles.

3. The bracket of claim 1, wherein the seat comprises a first L-shaped bracket overlapping a second L-shaped bracket.

4. The bracket of claim 3, wherein the wearstrip receptacle includes a curved arm extending from the base and the overlapping L-shaped brackets are fastened to the curved arm.

5. The bracket of claim 1, wherein the shaft holder further includes tabs on each side of the opening for securing a strap to hold a conveyor frame shaft in the opening.

6. The bracket of claim 1, further comprising a second containment block receptacle at a second side of the base for receiving a second containment block.

7. A method of retrofitting a positive-drive low tension thermoplastic conveyor belt to a flat belt conveyor frame, comprising the steps of:
    attaching a plurality of conversion brackets to shafts on the conveyor frame, each conversion bracket including a plurality of shaft holders and a plurality of wearstrip holders; and
    inserting wearstrips into the wearstrip holders, such that the wearstrips rest on the tops of the shafts.

8. The method of claim 7, further comprising the step of:
    inserting containment blocks into containment block receptacles on the conversion brackets.

9. The method of claim 7, further comprising the step of securing the shafts in the shaft holders.

10. The method of claim 7, wherein the wearstrip holders comprises a first L-shaped bracket overlapping a second L-shaped bracket.

11. The method of claim 10, wherein the wearstrip receptacle includes a curved arm and the overlapping L-shaped brackets are fastened to the curved arm.

12. The method of claim 7, further comprising the step of connecting ends of serial wearstrips using a wearstrip connector.

13. The method of claim 12, wherein the wearstrip connector comprises two halves that mate to form a seat for the ends of the wearstrips.

14. A conveyor frame, comprising:
    a central spine extending from a first end to a second end;
    a plurality of shafts extending from the central spine;

a plurality of brackets attached to selected shafts;
a plurality of wearstrips inserted into wearstrip holders on the brackets such that the wearstrips rest on the tops of the shafts; and
containment blocks inserted in containment block receptacles on the brackets.

* * * * *